(12) United States Patent
Lamb et al.

(10) Patent No.: US 9,298,195 B2
(45) Date of Patent: Mar. 29, 2016

(54) THERMALLY ACTUATED POWER ELEMENT WITH INTEGRAL VALVE MEMBER

(71) Applicant: Rostra Vernatherm, LLC, Bristol, CT (US)

(72) Inventors: Kevin W. Lamb, West Hartford, CT (US); Kenneth Lionello, Waterbury, CT (US)

(73) Assignee: Rostra Vernatherm, LLC, Bristol, CT (US)

( * ) Notice: Subject to any disclaimer, the term of this patent is extended or adjusted under 35 U.S.C. 154(b) by 611 days.

(21) Appl. No.: 13/676,244

(22) Filed: Nov. 14, 2012

(65) Prior Publication Data

US 2014/0131460 A1    May 15, 2014

(51) Int. Cl.
| | |
|---|---|
| G05D 23/13 | (2006.01) |
| G05D 23/185 | (2006.01) |
| F01P 7/02 | (2006.01) |
| G05D 23/02 | (2006.01) |

(52) U.S. Cl.
CPC .................................. G05D 23/022 (2013.01)

(58) Field of Classification Search
CPC .......................... G05D 23/022; G05D 23/1852
USPC ..................... 236/99 K, 2.15, 34, 12.11, 34.5
See application file for complete search history.

(56) References Cited

U.S. PATENT DOCUMENTS

| | | | | |
|---|---|---|---|---|
| 3,935,998 | A * | 2/1976 | Caldwell | 236/1 C |
| 4,133,478 | A * | 1/1979 | Place | 236/48 R |
| 4,258,799 | A * | 3/1981 | Eckman | 173/169 |
| 4,269,350 | A * | 5/1981 | Beck | 236/34.5 |
| 5,931,445 | A * | 8/1999 | Dvorak et al. | 251/118 |
| 6,027,639 | A * | 2/2000 | Lenhart et al. | 210/108 |
| 6,772,958 | B1 | 8/2004 | Lamb et al. | |
| 6,988,364 | B1 | 1/2006 | Lamb et al. | |
| 7,469,841 | B1 | 12/2008 | Lamb et al. | |
| 7,617,700 | B2 | 11/2009 | Lamb et al. | |
| 8,636,225 | B2 * | 1/2014 | Pottie | 236/34 |
| 2004/0244850 | A1 * | 12/2004 | Browne et al. | 137/625.5 |
| 2005/0262906 | A1 * | 12/2005 | Romero et al. | 70/107 |
| 2006/0266887 | A1 * | 11/2006 | Holder | 244/129.5 |
| 2008/0061155 | A1 * | 3/2008 | Seymour | 236/12.11 |
| 2008/0116227 | A1 * | 5/2008 | Leuliet et al. | 222/321.9 |
| 2008/0251591 | A1 * | 10/2008 | Miyamoto et al. | 236/99 K |
| 2010/0192872 | A1 * | 8/2010 | Tomlinson | 122/14.3 |
| 2010/0200783 | A1 | 8/2010 | Lamb et al. | |
| 2012/0247582 | A1 | 10/2012 | Lamb et al. | |

\* cited by examiner

*Primary Examiner* — M. Alexandra Elve
*Assistant Examiner* — Henry Crenshaw
(74) *Attorney, Agent, or Firm* — Alix, Yale & Ristas, LLP

(57) ABSTRACT

A thermally actuated power element comprising an actuator having a guide, defining a generally cylindrical bore extending between first and second guide ends. The guide first end has a generally convex valve member projecting radially between the bore and a valve member periphery, defining a plurality of substantially identical flow depressions. The flow depressions are configured radially intermediate the cylindrical bore and the periphery, while an annular valve member seal surface extends between a radial boundary of the flow depressions and the periphery. A piston having axially opposed first and second piston ends is partially received in the generally cylindrical cavity. A generally concave cup defines a cavity and contains a thermally active pellet, and a diaphragm is received in the guide second end intermediate the cup and said piston. A generally cylindrical return member engages the guide adjacent the periphery.

21 Claims, 4 Drawing Sheets

THERMALLY ACTUATED POWER ELEMENT WITH INTEGRAL VALVE MEMBER

BACKGROUND OF THE DISCLOSURE

The present disclosure relates to thermally actuated flow-control valves. More particularly, the present disclosure relates to valves including wax-filled actuators employed to control the flow of transmission fluid or coolant in automatic transmissions or other heat producing automotive systems.

The use of wax-filled actuators or wax motors in automotive systems is well known. Wax actuators typically utilized in automotive systems are employed to regulate the flow of engine fluids and prevent overheating. Such actuators are designed to open or close in response to a predetermined change in temperature. Wax-filled actuators are reliable temperature sensitive actuators that require no external energy, such as electricity or externally applied actuation force, such as a cable or lever.

In temperature sensitive automotive systems, there is no or restricted flow of fluid to designated fluid passages when the fluid is cool and the wax actuator is closed. As the fluid warms up, the wax actuator begins to open, and permits fluid to flow. As the temperature of the fluid increases, the wax actuator progressively reaches its fully open, or fully "stroked" position, when the fluid reaches a predetermined operating temperature. The wax actuator fluctuates between the nominal opening position and the fully stroked position as the temperature of the engine fluctuates.

The wax actuator conventionally comprises a rigid wax-filled cup, a guide and a piston received within the guide. The wax transitions between a solid and a liquid state over a predetermined temperature range, and typically expands in volume as the wax becomes a liquid. The guide is fixed to the cup and retains a flexible diaphragm to contain the wax in the cup. The guide defines an axial passage for a piston, which reciprocates in the axial passage according to pressure from the wax beneath the diaphragm. Thus, the axial length of the actuator changes according to the temperature of the wax, which is responsive to the temperature of the surrounding fluid.

The wax-filled actuator is typically contained in a housing or aperture, with the piston arranged to deliver the force of the expanding wax to move the actuator body (the cup/guide) which may include a disc valve affixed to the piston, the cup/guide, or both. A return spring is also positioned to return the piston to its retracted/cold position when the temperature of the fluid falls and the wax returns to its smaller volume. The return spring is selected to overcome the friction of the piston in the axial passage and any linkage or valve associated with the actuator, to ensure reliable return to the closed or cold position.

In prior art wax-filled actuators of this type, there is a trade-off between the space occupied by the device, and the amount of fluid flow through the system. Under certain circumstances, the size and structure of the actuator may inhibit the effective flow of fluid through the system. Decreased fluid flow is particularly troublesome in systems having sensitive components requiring an adequate supply of fluid, yet other structural considerations limit the free space that the actuator may travel between the open and closed positions. Thus, spacial constraints limit the effectiveness of wax actuators in certain environments.

Consequently there exists a need for a simple thermally actuated flow-control valve that allows fluid to flow efficiently through the system with a limited amount of travel between the open and closed positions.

SUMMARY

According to aspects of the disclosure, a thermally actuated power element having a longitudinal axis and configured for use in a generally cylindrical manifold comprises an actuator having an integrated valve member and a return member.

The actuator has a guide coaxial with the longitudinal axis, which defines a generally cylindrical bore extending between first and second guide ends. The guide first end includes a generally convex valve member which projects radially between the bore and a valve member periphery. A plurality of identical flow depressions are defined radially intermediate the cylindrical bore and the periphery, and an annular valve member seal surface extends between a radial boundary of the flow depressions and the periphery. The valve member seal surface is configured to provide a seal with the manifold in the closed position.

A piston having first and second piston ends axially reciprocates within the cylindrical bore of the guide. The piston is partially received in the cylindrical bore such that the piston first end projects from the guide first end.

A concave cup defining a bore and having a peripheral lip mates with the guide second end. A thermally active wax pellet is received in the cavity, and a diaphragm is received intermediate the cup and the piston in the guide second end. The wax pellet and diaphragm exert a variable actuating force on the piston second end dependent upon the environmental temperature. The actuating force increases as the temperature rises between a first environmental temperature $T_1$ and a second environmental temperature $T_2$. As the temperature increases between $T_1$ and $T_2$ progressively more of the piston first end projects from the guide first end.

A cylindrical return member has first and second ends. The first return member end engages the guide at a location adjacent the valve member periphery. The return member may have a generally tapered diameter such that the first return member end is diametrally narrower than the second return member end.

The manifold is typically coaxial with the longitudinal axis and may comprise a generally cylindrical main chamber. The main chamber includes first and second axially opposed ends, and flow-outlet and flow-inlet conduits are defined at the chamber first and second ends, respectively. The chamber first end has an annular valve seat, which projects radially inwardly from the main chamber and cooperates with the valve member seal surface to create a seal. In one embodiment, the seal is created and the actuator is configured in the closed position when the fluid surrounding the power element is cold. The flow inlet and outlet conduits may be reversed, depending upon the environment in which the power element is used. The temperatures at which the valve is configured in the open or closed position may also be reversed, such that the valve is in the open position when the environmental temperature is cold and in the closed position when the environmental temperature is hot.

The manifold includes two abutments to center the power element within the manifold. The abutments are disposed at opposite ends of the manifold; a first abutment engages the piston first end while a second abutment engages the return member second end.

In one embodiment, the abutment that engages the piston first end is a webbed support structure. The webbed support structure has a detent which acts as a seat for the actuator. In this embodiment, a plurality of concentrically arranged tabs act as the abutment engaging the return member second end. The webbed support structure and the tabs cooperate to center the power element within the manifold, and prevent high pressure and fast flowing fluids from dislodging the actuator and/or disrupting the seal.

The thermally actuated power element and flow-control assembly of the present disclosure provide advantages over and relative to the prior art. For example, the configuration of the valve member, particularly the configuration of the flow depressions, gives the power element improved hydrodynamic characteristics over the prior art. This is particularly important in fluid flow systems that may be highly pressurized and/or have large volumes of fluid flowing through the system at relatively high velocity.

As a result of the improved hydrodynamics, the power element is more compact than prior art elements. Less valve throw, or distance between the open and closed positions, is required to achieve the same amount of fluid flow in comparison to prior art power elements. Consequently, the manifold may also be smaller while avoiding the reduction in fluid flow that could result if the actuator were to project into the flow path (i.e. the flow-inlet conduit).

BRIEF DESCRIPTION OF THE DRAWING

Aspects of the preferred embodiment will be described in reference to the Drawing, where like numerals reflect like elements.

DETAILED DESCRIPTION

Figure 1:
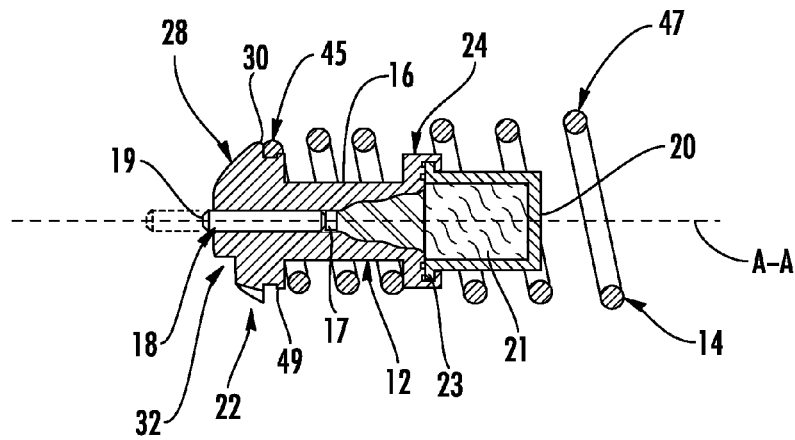
FIG. 1 is a cross-sectional view, partly in phantom, of one embodiment of a thermally actuated power element.

With reference to the drawings wherein like numerals represent like parts throughout the figures, a thermally actuated power element with integral valve member 10 is disclosed herein. Referring to FIG. 1, the power element 10 has a longitudinal axis A-A, an actuator 12, and a generally cylindrical return member 14. The actuator 12 comprises a guide 16 coaxial with the longitudinal axis A-A, a piston 18, and a generally concave cup 20. The cup 20 contains a thermally active wax pellet 21.

Figure 2:
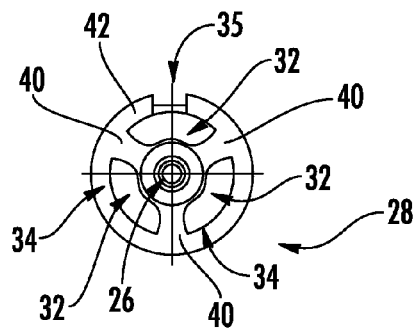
FIG. 2 is a frontal view of the valve member from the embodiment of the power element illustrated in FIG. 1, all other elements are omitted for clarity.
Figure 3:
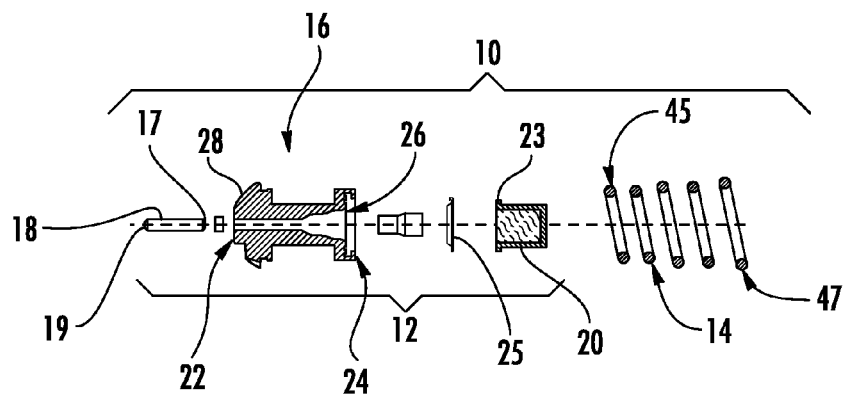
FIG. 3 is an exploded, cross-sectional view from the embodiment of the power element illustrated in FIG. 1.
Figure 4:
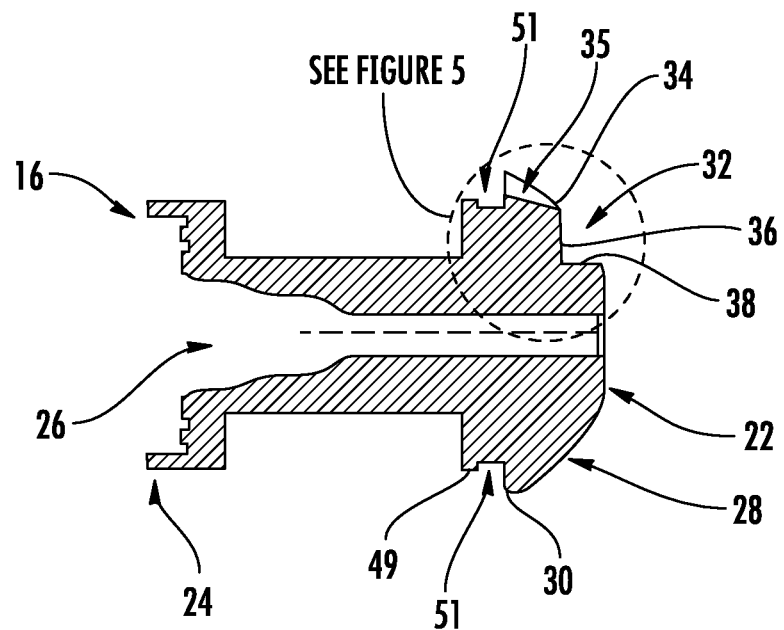
FIG. 4 is a cross-sectional view of the guide from the embodiment of the power element illustrated in FIG. 1, all other elements are omitted for clarity.

As shown in FIGS. 1, 2, and 4, the guide 16 has first and second axial guide ends 22 and 24, respectively. The guide 16 defines a generally cylindrical bore 26 between the first and second guide ends 22 and 24. As seen in FIGS. 1 and 3, the cup 20 has a peripheral lip 23 which projects radially outwardly, and the guide second end 24 is crimped around the peripheral lip 23 to attach the cup to the guide 16.

Figure 6:
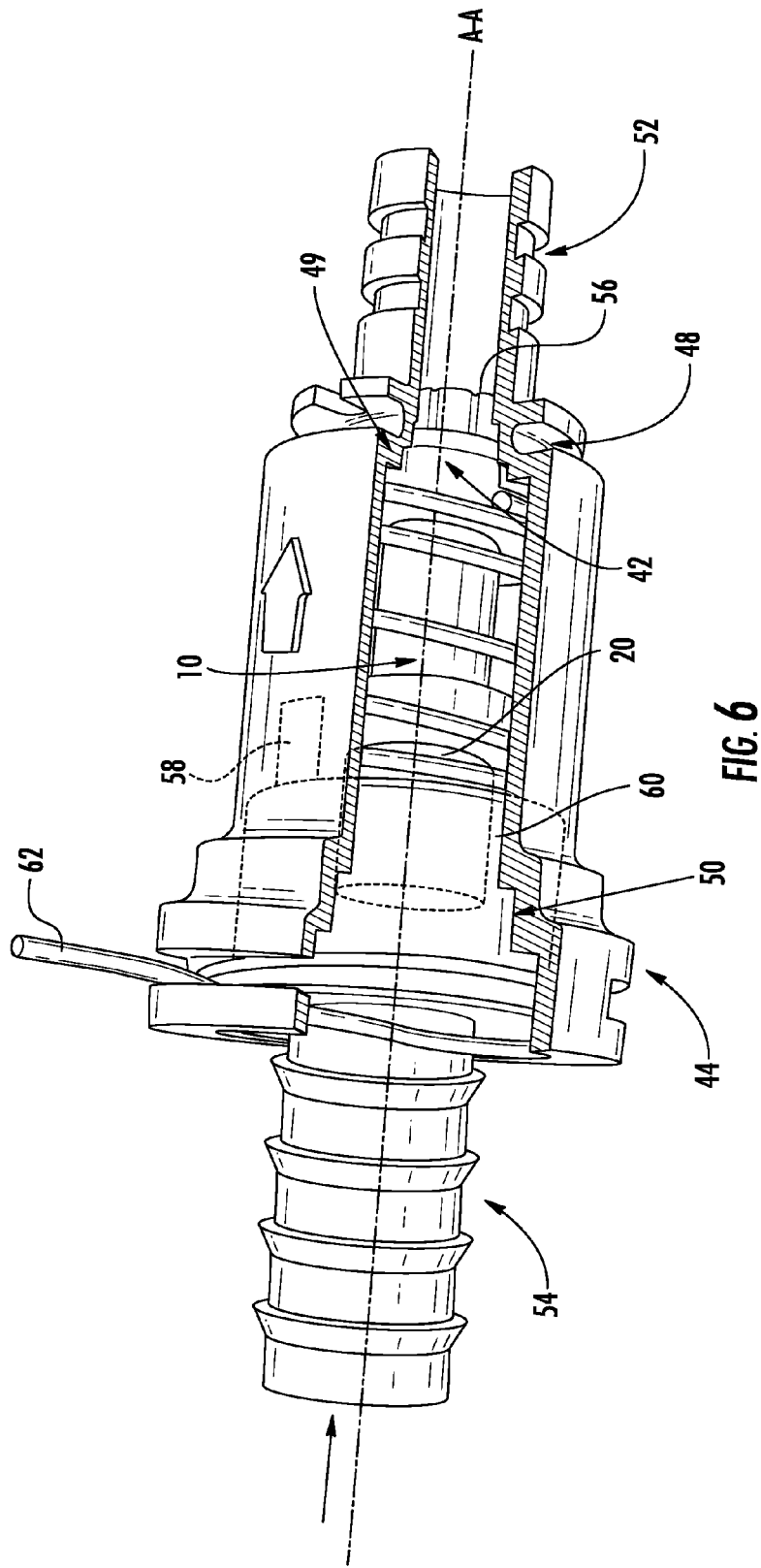
FIG. 6 is a side view of a thermally actuated flow-control assembly, where a portion of the manifold has been cut away to better illustrate the interior of a main chamber and a flow outlet conduit at an environmental temperature below $T_1$; part of the inner portion and one of the circumferentially spaced axially projecting tabs are shown in phantom.
Figure 7:
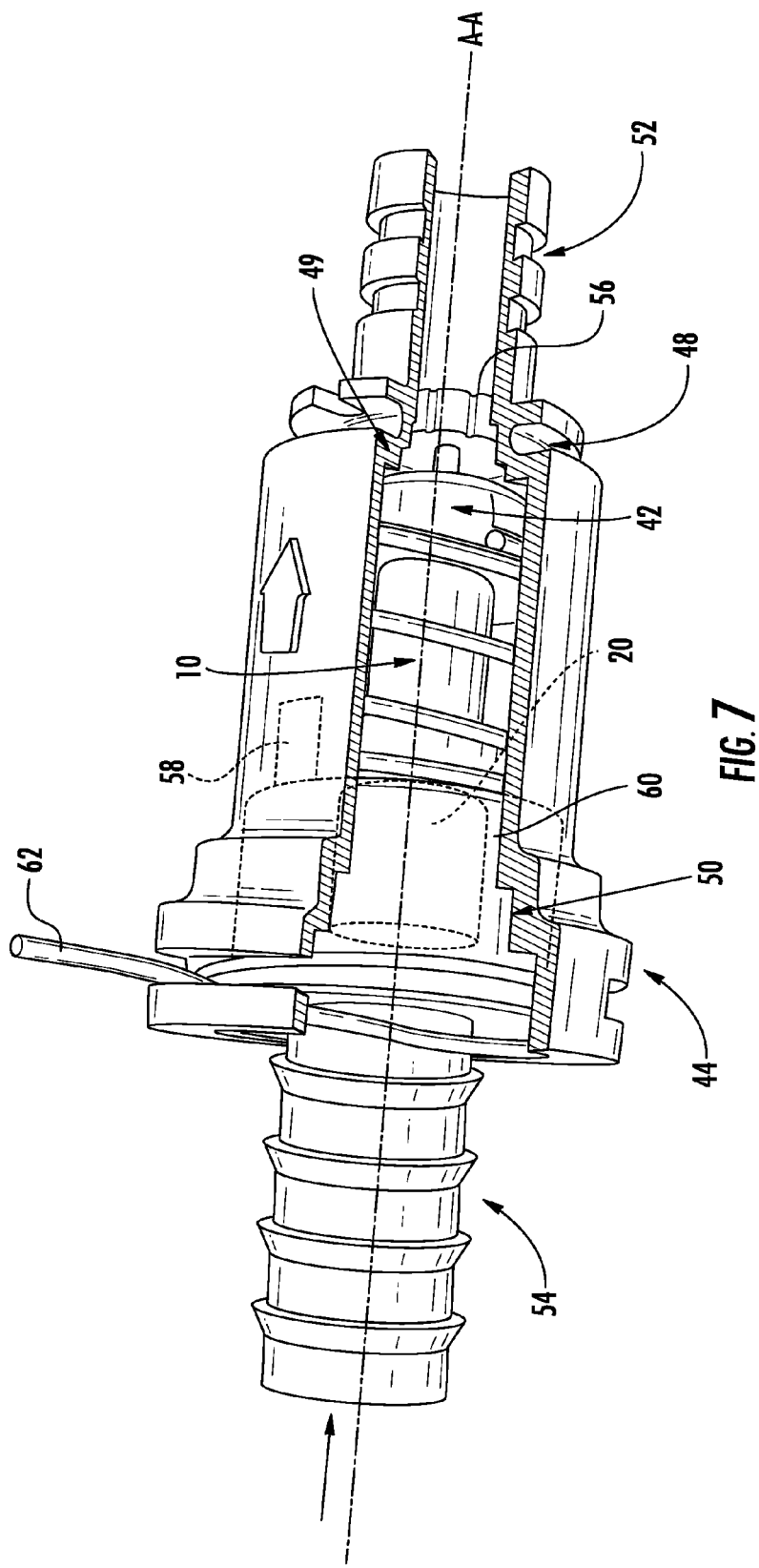
FIG. 7 shows the embodiment of the thermally actuated flow-control assembly depicted in FIG. 6, where the environmental temperature is above $T_1$; part of the inner portion and one of the circumferentially spaced axially projecting tabs are shown in phantom.

The piston 18 has axially opposed first and second piston ends 19 and 17, respectively. The piston 18 is partially received in the cylindrical bore 26 so that the piston first end 19 projects from the guide first end 22. The piston first end 19 is configured to engage a first abutment of a manifold 44 (FIGS. 6 and 7, discussed in detail below). Referring to FIG. 3, a diaphragm 25 is received in the guide second end 24 intermediate the cup 20 and the piston 18. The guide first end 22 includes a generally convex valve member 28, extending radially from the bore 26 to a valve member periphery 30. In one embodiment, the valve member 28 is generally hemispherical.

In one embodiment, the wax pellet 21 and diaphragm 25 exert a variable actuation force on the piston 18 as the temperature rises between a first environmental temperature $T_1$ and a second environmental temperature $T_2$, causing the piston 18 to reciprocate within the bore 26. Progressively more of the piston 18 projects from the guide end as the environmental temperature rises from $T_1$ to $T_2$. $T_1$ is therefore the nominal opening temperature, while $T_2$ is the temperature at which the actuator is fully stroked. In one embodiment $T_1$ is approximately 180° F. and $T_2$ is approximately 203° F.

$T_1$ and $T_2$ may be adjusted to suit the particular environment in which the actuator 10 is employed by choosing any one of a multitude of thermodynamic waxes. Additionally, the configuration of the actuator 10 may be altered such that the variable actuating force increases as the environmental temperature declines from $T_2$ to $T_1$, such that $T_2$ is the nominal opening temperature and $T_1$ is the temperature at which the actuator is fully stroked.

As best seen in FIGS. 2 and 4, the convex surface of the valve member 28 is interrupted by a plurality of substantially identical depressions 32 which act to improve the flow of fluid around the valve member. The depressions 32 reduce turbulence, and improve the flow of fluid around the valve member 28. Referring to FIGS. 1, 2, 4, and 5, the depressions 32 are defined on the convex surface of the valve member, intermediate the bore 26 and the valve member periphery 30. As best seen in FIG. 2, the depressions 32 are circumferentially equidistantly spaced around the valve member 28 and a radially exterior boundary 34 of the depressions 32 runs parallel with the periphery 30.

Figure 5:
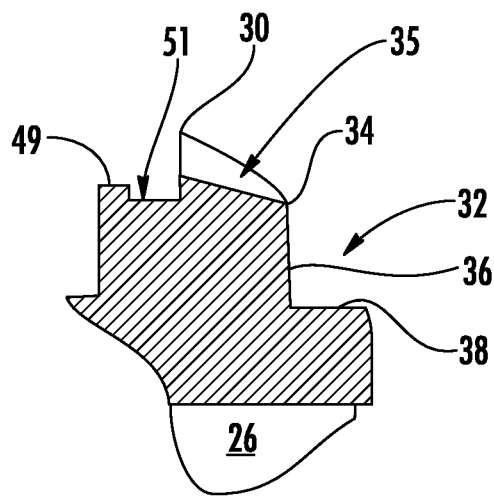
FIG. 5 is a close up cross sectional view of the bleedby notch and one of the flow depressions of the guide illustrated in FIG. 4.

As shown in FIGS. 4 and 5 the depressions 32 have planar surfaces 36 extending radially between the exterior boundary 34 and an interior boundary 38. The interior boundary 38 runs parallel to the exterior boundary 34. As best seen in FIG. 2, a portion 40 of the convex vale member extends perpendicularly between the planar surfaces 36 of each depression 32.

An annular valve member seal surface 42 extends between the exterior boundary 34 of the flow depressions 32 and the valve member periphery 30. The valve member seal surface 42 mates with a complementary annular surface of the manifold 44 (FIGS. 6 and 7, discussed in detail below) when the valve is in the closed position.

Referring to FIGS. 1 and 3, the return member 14 has first and second return member ends 45 and 47, respectively. As best seen in FIG. 3, the return member 14 may have a tapered diameter, such that the return member first end 45 is narrower diametrally than the return member second end 47. The return member first end 45 is configured to engage the valve member 28 of the actuator adjacent the valve member periphery 30. In one embodiment, best seen in FIGS. 1, 4, and 5, the valve member has a radially projecting collar 49 disposed axially rearward of the valve member periphery 30. The collar 49 and the valve member periphery 30 define an annular return member retention channel 51 which operates in connection with the collar 49 to engage the return member first end 45.

As best seen in FIGS. 2, 4 and 5, the valve member 28 defines at least one bleedby notch 35. The bleedby notch extends axially between the exterior boundary 34 of one of the flow depressions 32 and the retention channel 51. The bleedby notch extends radially between the exterior boundary 34 of one of the flow depressions 32 and the periphery 30 interrupting the valve member seal surface. As best seen in FIG. 5, the bleedby notch 35 may be slightly radially outwardly angulated. The bleedby notch 35 is designed to allow a small amount of fluid to flow past the valve member 28 when valve is in the closed position.

The bleedby notch 35 ensures the accuracy and efficiency of the cooling feedback loop. The bleedby notch 35 allows fluid to pass by the valve member 28 and ensures that as the temperature sensitive components of the automotive systems warm up, the environmental temperature surrounding the power element 10 rises to a corresponding degree. Thus, when the power element is used as a thermostatic element, the bleedby notch 35 ensures the power element is exposed to changes in the temperature of the system fluid.

Referring to FIGS. 6 and 7, a manifold 44 is also configured for use with the power element 10. The manifold 44 is coaxial with the longitudinal axis A-A and has a main chamber 46. In the embodiment shown in FIGS. 6 and 7, the main chamber 46 is generally cylindrical. The main chamber 46 has axially opposed chamber first and second ends 48 and 50, respectively. The chamber first end 48 includes an annular valve seat 49 which projects radially inwardly from the main chamber 46. The valve seat 49 is sized to mate with the valve member seal surface 32, and to allow a small amount of fluid flow via the bleedby notch 35.

A flow-outlet conduit 52 is defined at the chamber first end 48, while a flow-inlet conduit 54 is defined at the chamber second end 50. Flow-inlet and outlet conduits 52 and 54 each have an abutment, which acts to center the power element 10 within the manifold 44. In one embodiment, the abutment of the flow-outlet conduit 52 is a webbed structure 56 having a detent 57, which supports the piston first end 19. In addition to centering the power element 10 within the manifold 44, the webbed structure 56 may also define a plurality of fluid paths to improve flow through the main chamber 46 and out the flow-outlet conduit 52. In one embodiment, the abutment at the flow-inlet conduit 54 comprises a plurality of circumferentially spaced axially projecting tabs 58.

As shown in FIGS. 6 and 7, an interior portion 60 of the flow-inlet conduit 54 projects into the main chamber 46 at the second end 50. The interior portion 60 is generally cylindrical, and the plurality of tabs 58 are disposed on the interior portion 60 projecting into the main chamber 46. The interior portion 60 and the tabs 58 are configured such that the tabs 58 engage the second return member end 47. In one embodiment, the return member second end 47 is configured to have an interior circumference slightly larger than the circumference of the tabs 58. This configuration ensures that the power element 10 is properly positioned within the manifold 44, preventing high pressure and the fast flow of fluids from dislodging the power element 10.

The interior portion 60 projects into the main chamber 46 such that progressively more of the cup 20 of the power element 10 is received in the interior portion 60 as the actuator 12 reciprocates between the closed and fully stroked configuration. The power element 10, interior portion 60 and tabs 58 are configured so that fluid may flow through the manifold even when the actuator 12 is in the fully stroked configuration. To ensure that the power element 10 does not impede fluid as it flows through the flow-inlet conduit 54, the actuator 12 can be manufactured to have a specific total axial length in comparison to the length of the main chamber 46 as measured from the chamber first end 48 to the interior portion 60 (discussed in greater detail below).

As shown in FIGS. 6 and 7, the manifold may be manufactured as two distinct pieces, one piece comprising the main chamber 46 and flow-outlet conduit 52, the second piece comprising the flow-inlet conduit 54. As shown in FIGS. 6 and 7, the two manifold pieces are connected by a spring clip 62.

As discussed above, the shape of the valve member 28 and the configuration of the depressions 32 provide a hydrodynamically efficient path for fluid flow when the valve is open. As progressively more of the piston first end 19 projects from the guide first end 22 as the actuator 12 transitions from the closed configuration to the fully stroked configuration, the seal between the valve member seal surface 42 and the valve seat 48 is broken and progressively more fluid flows past the valve member 28. While the convex shape of the valve member 28 smoothes flow of fluid around the valve member 28 in comparison with other potential configurations, the depressions 32 provide an even greater increase in fluid flow. The depressions 32 provide a larger pathway for fluid travel, allowing more fluid to flow past the valve member 28 than if valve member 28 had an uninterrupted surface. As a result, configuration of the valve member 28 allows for effective volumes of fluid to flow through the system with limited movement of the actuator 12. Thus, the power element 10 may be manufactured such that an axial length of the piston 18 projecting from the guide first end 22 between the nominal opening and fully stroked configurations is smaller in comparison to prior art power elements. This is particularly advantageous in automotive systems where space is limited and potentially high volumes of fluid are required to pass through the system dependent upon temperature fluctuation.

The power element 10 and the manifold 44 must be configured to ensure that progressively more fluid flows past the valve member 28 as the environmental temperature rises from $T_1$ to $T_2$. One manner of ensuring the proper rate of fluid flow is to manufacture the power element and manifold to have lengths adhering to specific ratios. A ratio of the axial length of the piston projecting from the first end of the guide to the total axial length of the actuator is selected from a range from approximately 0.065:1.48 to approximately 0.035:1.48 at $T_1$, and from approximately 0.325:1.48 to approximately 0.275:1.48 at $T_2$.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A thermally actuated power element having a longitudinal axis and configured for use in a manifold, the thermally actuated flow-control valve comprising:
   an actuator having
   a guide coaxial with the longitudinal axis, and defining a generally cylindrical bore extending between first and second guide ends, said guide first end having a generally convex valve member projecting radially between said bore and a valve member periphery, said convex valve member defining a plurality of substantially identical flow depressions radially intermediate said cylindrical bore and said periphery, an annular valve member seal surface extending between a radial boundary of said flow depressions and said periphery, a piston for axial reciprocation having axially opposed first and second piston ends, said piston partially received in said generally cylindrical bore such that said piston first end projects from said guide first end, a generally concave cup defining a cavity configured to contain a thermally active pellet, a peripheral lip of said cup configured to mate with said guide second end, a thermally active wax pellet received in said cup cavity, a diaphragm received in said guide second end intermediate said cup and said piston;

a return member having axially opposed first and second ends, said first return member end engaging said guide adjacent said periphery; and wherein said thermally active wax pellet exerts a variable actuating force on said piston second end causing said piston to reciprocate within said bore between an environmental temperature $T_1$ and $T_2$, progressively more of said piston projecting from said guide first end as said environmental temperature rises from $T_1$ to $T_2$.

2. The thermally actuated power element of claim 1, wherein said peripheral lip of said cup projects radially outwardly, and said guide second end has a mating shoulder crimped around said radially extending lip.

3. The thermally actuated power element of claim 1, wherein said guide has a radially projecting collar axially rearward of said valve member periphery, said collar and said valve member periphery defining an annular return member retention channel, said channel configured to engage said first return member end.

4. The thermally actuated power element of claim 3, wherein said annular valve member seal surface defines at least one bleedby notch running axially between one of said flow depressions and said retention channel and radially between said radial boundary of said flow depressions and said periphery interrupting said annular valve member seal surface.

5. The thermally actuated power element of claim 1, wherein said return member has a tapered diameter, such that said diameter at said first return member end is narrower than said diameter at said return member second end.

6. The thermally actuated power element of claim 1, wherein said generally convex valve member is hemispherical.

7. A thermally actuated power element having a longitudinal axis and configured for use in a manifold, the thermally actuated flow-control valve comprising:

an actuator having a guide coaxial with the longitudinal axis and defining a generally cylindrical bore extending between first and second guide ends, said guide first end having a generally convex valve member projecting radially between said bore and a valve member periphery, wherein said valve member includes a plurality of flow depressions intermediate said bore and said periphery, each flow depression defined by a generally planar surface extending radially between flow depression inner and outer boundaries and an axially oriented flow depression wall extending between from said surface to said guide first end, said flow depression outer boundary being concentric with said periphery, and wherein said flow depressions are circumferentially equidistant from one another and an annular valve member seal surface extends radially between said flow depression outer boundary and said periphery, a piston for axial reciprocation having axially opposed first and second piston ends, said piston partially received in said generally cylindrical bore such that said piston first end projects from said guide first end, a generally concave cup defining a cavity configured to contain a thermally active pellet, a peripheral lip of said cup configured to mate with said guide second end, a thermally active wax pellet received in said cup cavity, a diaphragm received in said guide second end intermediate said cup and said piston;

a generally cylindrical return member having axially opposed first and second ends, said first return member end engaging said guide adjacent said periphery; and wherein said thermally active wax pellet and diaphragm work in concert to exert a variable actuating force on said piston second end causing said piston to reciprocate within said bore between an environmental temperature $T_1$ and $T_2$, progressively more of said piston projecting from said guide first end as said environmental temperature rises from $T_1$ to $T_2$.

8. The thermally actuated power element of claim 7, wherein said peripheral lip of said cup projects radially outwardly, and said guide second end has a mating shoulder crimped around said radially extending lip.

9. The thermally actuated power element of claim 7, wherein said guide has a radially projecting collar axially rearward of said valve member periphery, said collar and said valve member periphery defining an annular return member retention channel, said channel configured to engage said return member first end.

10. The thermally actuated power element of claim 9, wherein said annular valve member seal surface defines at least one bleedby notch axially between one of said flow depressions and said retention channel and radially between said radial boundary of said flow depressions and said periphery interrupting said annular valve member seal surface.

11. The thermally actuated power element of claim 7, wherein said return member has a tapered diameter, such that said diameter at said first return member end is narrower than said diameter at said return member second end.

12. The thermally actuated power element of claim 7, wherein said generally convex valve member is hemispherical.

13. A thermally actuated flow-control assembly having a longitudinal axis for use in a manifold coaxial with the longitudinal axis having a main chamber with first and second axially opposed chamber ends and an annular valve seat projecting radially inwardly from said chamber first end, flow-outlet conduit and flow-inlet conduit located at said first and chamber second ends and having a plurality of flow paths, respectively, said flow-outlet conduit having a webbed support structure defining the plurality of flow paths and configured at said first end having said annular valve seat, said flow-inlet conduit having a plurality of circumferentially spaced axially projecting tabs received in said main chamber, the thermally actuated flow-control assembly comprising:

a thermally actuated power element received in said manifold main chamber, said power element comprising:

an actuator having a guide coaxial with the longitudinal axis, and defining a generally cylindrical bore extending between first and second guide ends, said guide first end having a generally convex valve member projecting radially between said bore and a valve member periphery, said convex valve member defining a plurality of substantially identical flow depressions radially intermediate said cylindrical bore and said periphery, an annular valve member seal surface extending between a radial boundary of said flow depressions and said periphery, a piston for axial reciprocation having axially opposed first and second piston ends, said piston partially received in said generally cylindrical bore such that said piston first end projects from said guide first end, a generally concave cup defining a cavity configured to contain a thermally active pellet, a peripheral lip of said cup configured to mate with said guide second end, a thermally active wax pellet received in said cup cavity, and a diaphragm received in said guide second end intermediate said cup and said piston;

a generally cylindrical return member having axially opposed first and second ends, said first return member end engaging said guide and said return member second end engaging said chamber second end, said return member exerting a biasing force on said actuator towards said flow outlet of the manifold; and wherein said actuator exerts a variable actuating force on said piston second end causing said piston to reciprocate within said bore between an environmental temperature $T_1$ and $T_2$, and progressively more of said piston projects from said guide first end as said environmental temperature rises from $T_1$ to $T_2$; and wherein said annular valve member seal surface creates a seal with said valve seat at said first actuator length.

14. The thermally actuated flow-control assembly of claim 13, wherein said peripheral lip of said cup projects radially outwardly, and said guide second end is crimped around said radially extending lip.

15. The thermally actuated flow-control assembly of claim 13, wherein said guide has a radially projecting collar axially rearward of said valve member periphery, said collar and said valve member periphery defining an annular return member retention channel, said channel configured to engage said first return member end.

16. The thermally actuated flow-control assembly of claim 15, wherein said valve member defines at least one bleedby notch extending axially through said valve member periphery and configured to allow slight fluid flow past said valve member and said valve seat when said environmental temperature is below $T_1$.

17. The thermally actuated flow-control assembly of claim 13, wherein said webbed support structure acts as an anchor for said piston first end of said actuator.

18. The thermally actuated flow-control assembly of claim 13, wherein a generally cylindrical interior portion of said flow-inlet conduit projects axially into said main chamber second end and said axially extending tabs are disposed on said interior portion, wherein progressively more of said cup is received in said interior portion as said environmental temperature rises between $T_1$ and $T_2$, and wherein said cup and said interior portion are configured such that fluid may flow around said cup at $T_2$.

19. The thermally actuated flow-control assembly of claim 18, wherein said power element is configured such that at $T_2$, said cup is partially received radially inwardly of said axially extending tabs such that fluid flows between said flow-inlet and said flow-outlet at a progressively higher rate at $T_2$ than at $T_1$.

20. The thermally actuated flow-control assembly of claim 13, wherein said return member has a tapered diameter, such that said diameter at said first return member end is narrower than said diameter at said return member second end, and wherein said return member second end is sized such that an interior circumference of said return member second end engages said axially extending tabs.

21. The thermally actuated flow-control assembly of claim 17, wherein said generally convex valve member is hemispherical.

\* \* \* \* \*